INVENTOR.
THOMAS P. RONA

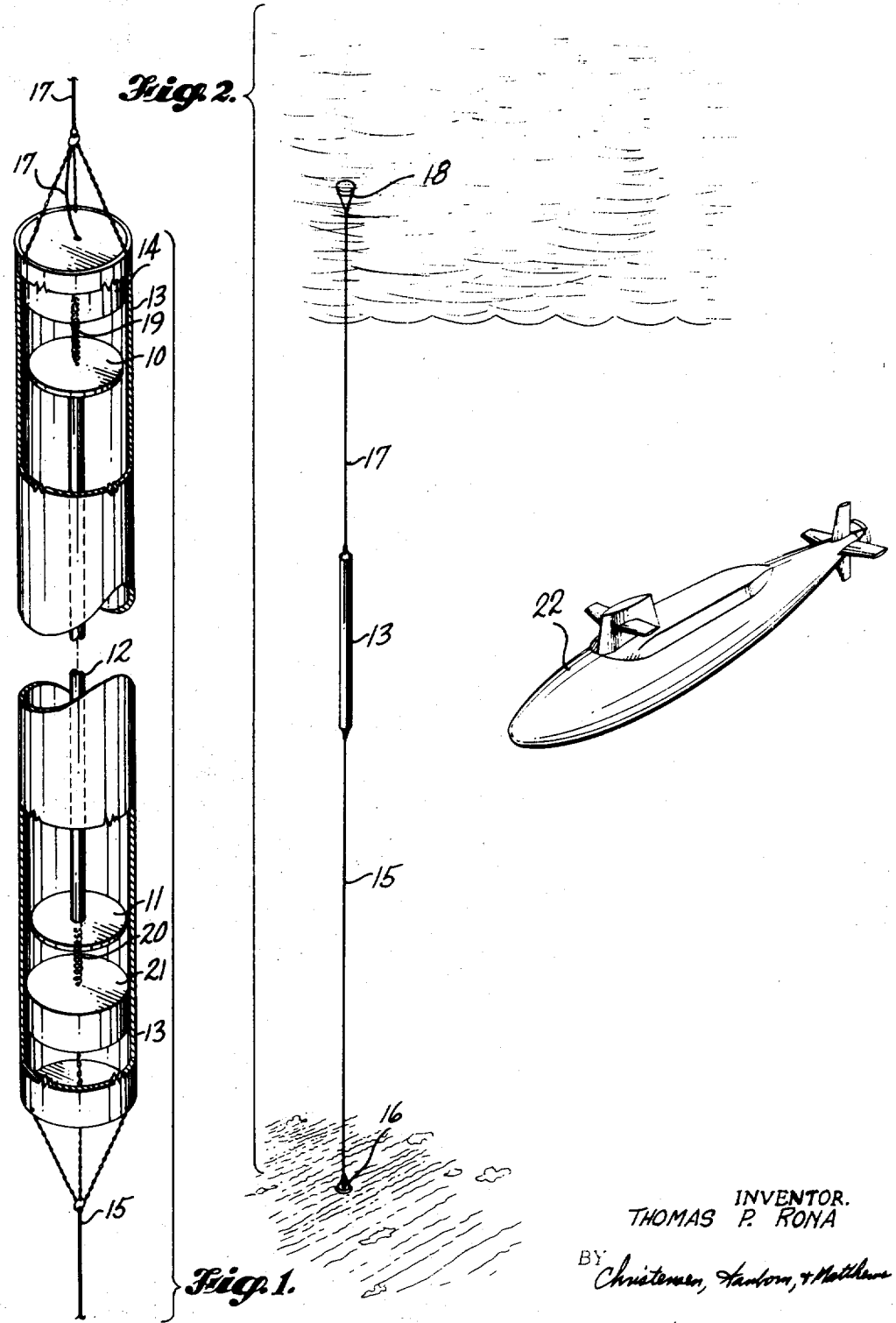

United States Patent Office 3,471,777
Patented Oct. 7, 1969

3,471,777
DIFFERENTIAL MAGNETOMETER HAVING PARALLEL ROTATING FIELDS AND ASSOCIATED SENSING CIRCUITRY
Thomas P. Rona, Seattle, Wash., assignor to The Boeing Company, Seattle, Wash., a corporation of Delaware
Filed Sept. 14, 1966, Ser. No. 579,423
Int. Cl. G01r 33/02; F42b 23/26, 21/00
U.S. Cl. 324—43        10 Claims

ABSTRACT OF THE DISCLOSURE

The present invention relates to an improved differential magnetometer for measuring gradients in a magnetic field. First and second core assemblies are displaced along an axis and energized by in-phase rotating magnetic fields which are perpendicular to the axis. Elongated ferromagnetic rods are disclosed as being aligned in two parallel planes with the rods secured to the central cores and being provided with windings for generation of the rotating fields. First and second sensing circuits respectively coupled with cores provide first and second output signals which are compared to provide an indication of any perturbation of one rotating field relative to the other. Mechanical and electrical details of a preferred embodiment are provided.

---

Figure 4:
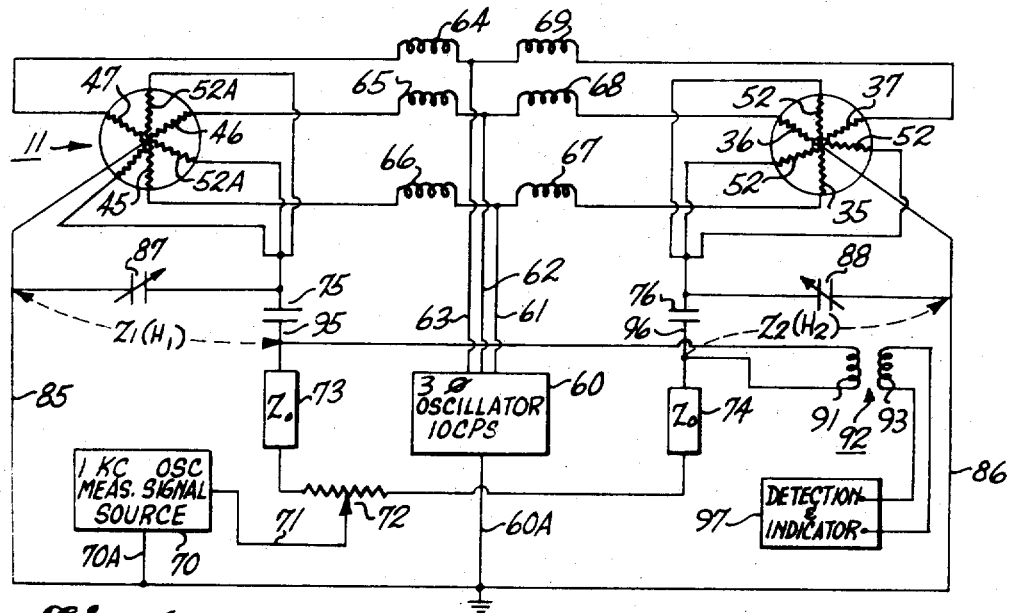

Magnetometers have found widespread uses in recent years and particularly in connection with the detection of surface ships, submarines and other magnetically susceptible objects in the water. Magnetometers (or gradiometers) in particular found widespread usage in floating mines as well as in the detonating devices of torpedoes. As a result of the effort expended in the field of magnetometers a relatively large number of such devices are now available making use of various phenomena such as changes in reluctance of a magnetic circuit, proton resonance, or modifications of optical and/or microwave characteristics of various vapors. While such instruments have met with success and have been produced at various costs and having varying sensitivity levels, it is found that most such instruments measure either the so-called "component field" so that the instrument must be carefully stabilized, or that the instrument is adapted to measure total field in which case it is substantially non-sensitive to direction. In instruments of the first type the direction of a magnetic field along a preferential axis of the instrument is measured and therefore if minute changes of direction of the instrument occur such are interpreted as modifications of the magnetic field and hence false indications are generated unless the instrument is very carefully stabilized. While instruments of the second type which measure total field do not have the problem of false signals caused by changes in direction of the instrument, it is found that such instruments will not measure deflections in the magnetic field without change in magnitude.

It is therefore an object of the present invention to provide an improved magnetometer which is insensitive to moderate changes in attitude and direction. Another object of the present invention is to provide a magnetometer which measures any change in magnitude or in direction of the field gradient. An additional object of the present invention is to provide a differential magnetometer which is insensitive to moderate changes in attitude and direction and yet which measures any change in magnitude or in direction of the field gradient without the need for expensive attitude control equipment. Another object of the present invention is to provide a magnetometer having directional sensitivity without the need for high instrument stability in terms of physical location within the field. A more specific object of the present invention is to provide an underwater differential magnetometer for detecting changes in magnetic field gradient caused by the presence of a ship.

In accordance with the teachings of the present invention the above advantages and objects are achieved through the use of a pair of magnetic core assemblies located at opposite ends of a rigid beam. The planes of the core assemblies are maintained parallel with each being perpendicular to the beam. Each core includes a plurality of ferromagnetic rods with the various rods in the two core assemblies being parallel with their respective counterparts within manufacturing tolerances. Each rod extends through the center of the core assembly so that pairs of rods are provided in each core. Each such pair of rods is provided with excitation coils which are energized by an oscillator in unison in a manner such that a rotating excitation field is provided for each core with the field rotation for the two core assemblies providing a bias field rotating at a first frequency.

In one system each core assembly has three rods so that a regular hexagonal system of magnetic axes is provided for each core assembly. The shape and configuration of the core and rod assemblies is such that an external field in the plane of the core assemblies induces within each core a magnetic field which is essentially proportional and parallel to the external field component parallel to such pane at the location of each core. When the cores are maintained with their planes substantially parallel to the earth surface the external field is that which would be generated by the superposition of the earth's magnetic field and a submarine dipole field when the magnetometer is disposed in the ocean.

Each core is also equipped with a multiplane common-mode impedance measuring circuit. In the specific example illustrated wherein a hexagonal arrangement of core rods is utilized a tri-phase common-mode impedance measuring circuit is utilized. Thus a hexagonal "spider" arrangement of sensing coils and laminated pole pieces is provided for each core assembly. The test coils of these "spider" assemblies form part of an impedance measuring circuit which is driven at a frequency much higher than the bias field frequency. Thus through the use of a tuned bridge circuit arrangement the impedance difference between the two core assemblies is measured to a very high degree of accuracy. Due to the non-linear induction vs. magnetic excitation characteristics of the core material, the measured impedance of each test coil is a very sensitive function of the magnitude of the magnetic excitation resulting from the superposition of the artificially induced bias field and the external field, i.e., the earth's magnetic field including possible local perturbations such as the one caused by the passage of a ship or submarine. If the external perturbation is not identical (in magnitude or direction) for both cores, the difference will be translated in a measurable impedance difference. Thus the output signals provide an accurate indication of any change in the magnitude or direction of the magnetic field gradient.

Figure 3:
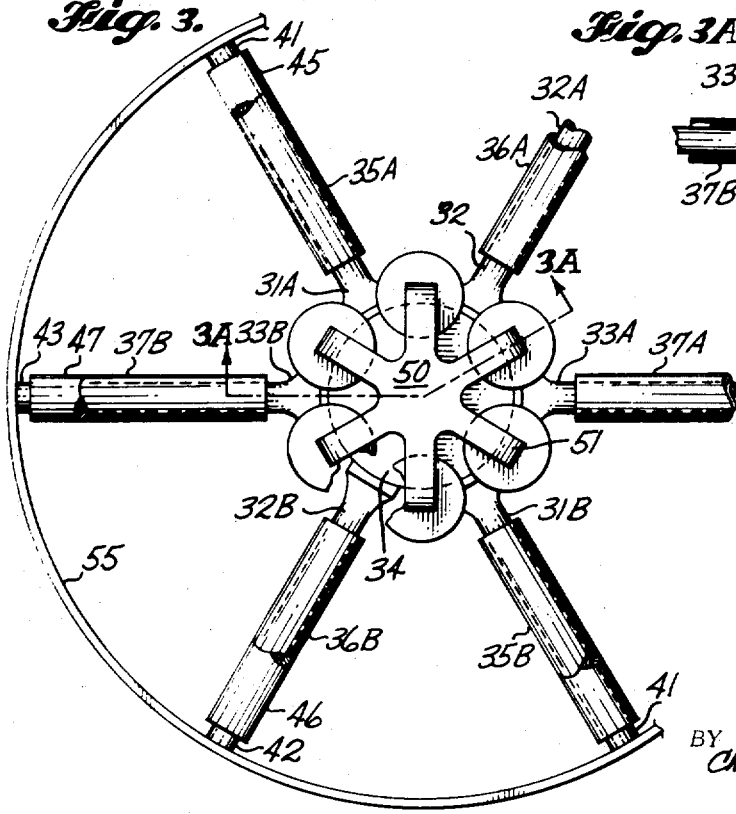
Figure 3A:
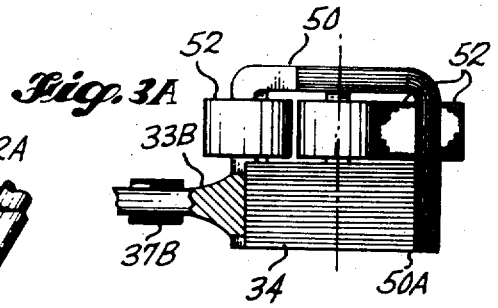

These and other aspects of the present invention will be more clearly understood from the following description when read with reference to the accompanying drawings wherein, FIGURE 1 is an isometric drawing with portions cut away from the casing for one specific type of magnetometer provided in accordance with the present invention for underwater use in detecting submarines, FIGURE 2 is a drawing of the magnetometer of FIGURE 1 located beneath the surface of the ocean and showing a submarine approaching the magnetometer, FIGURE 3 is an end view of one core and spider assembly of the magnetometer shown in FIGURE 1, FIGURE 3A is a cross-section along the lines 3A—3A of FIGURE 3 showing the construction details of one core and spider assembly, and FIGURE 4 is a schematic circuit diagram of one bias field and sensing coil circuit adapted for use in the system of the present invention.

Referring now to the drawings and in particular to FIGURE 1 an underwater embodiment of the differential magnetometer of the present invention is shown. The apparatus includes a pair of magnetic core and detector assemblies 10 and 11 having their planes maintained parallel to each other by being firmly secured to a rigid beam 12. The core and detector assemblies are disposed within an elongated tubular housing 13 held in a substantially vertical position by means of an air compartment 14 in the upper end thereof and an anchor and connecting cable assembly 15 and 16 at the lower end thereof. A signal transmission cable 17 extends through the upper end of the housing 13 and has its upper end maintained above or in the vicinity of the surface of the ocean by a suitable flotation device 18 (FIG. 2) so that the information provided by the magnetometer can be transmitted to a remote receiving station by any conventional radio or acoustic transmitter means. The core and detector assemblies 10 and 11 are held in position in the casing 13 by means of the springs 19 and 20, respectively, spring 19 being secured to the bottom of the air compartment 14 and spring 20 being secured to the electronics package and ballast compartment 21 in the lower portion of the casing. The internal pressure within the casing or housing 13 is preferably vented to the outside with the arrangement being such that when the assembly is anchored in place and stabilized by such purely passive means the longitudinal axis of the instrument will not depart from the vertical by more than 10°. With the instrument located beneath the surface of the ocean as seen in FIGURE 2, and with the axes of the core and detector assemblies being located as shown, the equipment will be sensitive to the vertical gradient of the horizontal component of the earth's magnetic field having the dipole field of a submarine 22 superposed thereon.

Referring now to FIGURE 3 the construction details of one preferred embodiment of the core and detector assemblies will be described. As seen in FIGURE 3 each core assembly includes three ferromagnetic rods with each of said rods having two sections extending in diametrically opposed directions from the central core piece. Thus the sections 31A, 31B in effect provide one rod, sections 32A and 32B another rod, and 33A, 33B a third rod with each extending perpendicularly from the outer surface of the cylindrical laminated core piece 34. Each rod end is provided with an excitation coil 35A, 36A, 37A, 35B, 36B, and 37B, respectively. Each pair of coils 35A–35B, 36A–36B, 37A–37B is connected with the two coils of the pair in series. The arrangement is such that a triphase system of excitation coils is provided for each of the three rod assemblies in the two core assemblies 10 and 11. The rods in the two core assemblies 10 and 11 are parallel to their respective counterparts with the excitation coils being connected such that each pair of rods (i.e., one rod from assembly 10 and one rod from assembly 11) is provided with an in phase excitation signal. Thus a triphase excitation system is provided for each of the two assemblies with the excitation being "in phase" for the two. In order to show the manner in which the core rods are aligned it will be seen in FIGURE 3 that the core rods 31, 32, and 33 for the assembly 10 are broken away near their outer ends so that the rods 41, 42 and 43 together with their associated excitation coils 45, 46 and 47 will be seen in exact alignment therewith and forming part of the core assembly 11 of FIGURE 1.

The arrangement will be seen to be such that each core and rod assembly allows an external field in the horizontal plane to induce within the core a magnetic field which is essentially proportional and parallel to the external horizontal field component at the location of each core. In addition, as seen in FIGURE 3 (and in FIGURE 4 to be described hereinafter) the excitation windings and associated three phase generator cause a constant arbitrary magnitude bias field to be superimposed upon the external field with the said bias field rotating in the plane of the cores with respect to the core orientation and at an angular velocity determined by the frequency of the excitation oscillator.

As seen in FIGURES 3 and 4, each core assembly includes a triphase common-mode impedance measuring circuit. Thus a hexagonal "spider"-shaped reluctance pickup frame 50 will be seen in FIGURES 3 and 3A to be disposed about the core 34. Each of the six legs 51 of the member 50 are cemented to the exterior of the core 34 along the line of contact 50A seen in FIGURE 3A. Each of the six legs 51 also has a separate sensing coil 52 disposed thereabout so that the impedance of the central core member 34 can be measured at the ferquency of the measurement signal oscillator 70 shown in FIGURE 4 connected to each of the sensing coils 52. The arrangement of the parts in the lower assembly 11 of FIGURE 2 is identical to that shown in FIGURES 3 and 3A for the upper unit 10.

To protect the various components in each of the core and detector assemblies a protective ring of nonmagnetic material 55 is preferably cemeted to the ends of the rods as shown in FIGURE 3.

Referring now to FIGURE 4 the details of one specific embodiment of the circuit arrangement for the system of the present invention will be described. A three phase oscillator 60 denoted as operating at ten cycles per second will be seen to be connected by its three output leads 61, 62 and 63 to the excitation coils 35, 36, 37 and 45, 46 and 47 through the filter coils 64–69. These filter coils 64–69 serve to effectively isolate the low frequency oscillator 60 from the high frequency signals of the measurement signal source 70 shown as a one kilocycles per second oscillator. It should be noted that the lead 61 is connected to the excitation coils 35 and 45 of the core assemblies 10 and 11 and that as seen in FIGURE 3 the rods associated with the coils 35 and 45 are in alignment with each other in the complete assembly shown in FIGURE 2. In a similar manner the lead 62 is connected to excitation coils 36 and 46, and the lead 63 is connected to the excitation coils 37 and 47. Each of the coils has one end thereof returned to the common signal ground lead 60A for the oscillator 60. The geometric and electrical configuration of the system is such that a constant bias field is provided for each of the two core assemblies with the bias fields rotating in the planes of the core assemblies at the angular velocity determined by the frequency of the excitation oscillator 60.

The measurement signal source 70 shown as a one kilocycle oscillator has its signal output lead 71 connected through the voltage divider 72, the impedance elements 73 and 74, and capacitors 75 and 76 to the sensing coils 52 and 52A (only three of each set of sensing coils being shown in FIGURE 4). One side of the various sensing coils is returned to the common ground 70A of the oscillator 70 by common leads 85 and 86. A pair of adjustable capacitors 87 and 88 will be seen to be respectively connected directly across each of the sets of sensing coils 52 and 52A in the respective core and detector assemblies 11 and 10. It should be noted that it would also be possible to use the excitation coils themselves as the sensing coils by using suitable frequency separation, such as by using appropriate isolation capacitors.

Since the impedance measuring circuit operates at a very high frequency by comparison to that of the bias field fluctuation, it will be seen that the bias field and the external field can be considered as quasi-static (i.e., varying very slowly with respect to the measurement). The effective field within the two core assemblies 10 and 11 is the result of the superposition of the external horizontal field component and the bias field and will sweep the range of magnetic excitation for both core assemblies in phase. The value of the effective excitation field in each core assembly is adjusted to be equal, and due to the geometric configuration, parallel to each other at any instant. This condition is only realized at the time when the equipment is initially set up with the outside field in both cores being equal and parallel, or the system is electrically balanced to provide zero output in the absence of a disturbing magnetic object located in the vicinity of the core assemblies. As seen in FIGURE 4 the primary winding 91 of a signal output transformer 92 is connected between the leads 95 and 96 which go to the sensing coils. The secondary winding 93 of transformer 92 is coupled to the detection indicator 97. Thus the voltage divider 72 and adjustable capacitors 87 and 88 are initially set so that a zero output is obtained. Once this has been accomplished it will be seen that the bridge will remain balanced unless a modification occurs in the external field component in one core with respect to the one that exists in the other. It should be noted that if the two core assemblies 10 and 11 are roated in any direction by the same amount no additional differential signal will be generated. The detection indicator 97 can be a conventional meter circuit adapted for visual observation in those uses of the equipment wherein an operator is able to be in the vicinity of the equipment for direct monitoring. In the embodiment of the invention illustrated in FIGURES 1 and 2 the entire assembly is submerged in the ocean and thus the signals from the detection indicator 97 are carried by the cable 17 to the transmitter 18 for transmission to a remote receiving station.

The quantity influenced by the external field disturbance is the state of magnetic polarization within the core assemblies. The states of polarization, as in any ferromagnetic material, are measures of the energy storage in the elementary dipoles and also define the incremental energy storage within the material under influence of small incremental fields. In the present system it is preferable to use core material which is nonoriented (i.e., isotropic in the radial direction). One such material known as Permalloy 45 having a "sensitivity" of 17% per 10,000$\gamma$ in the vicinity of 20,000$\gamma$ average field is suitable as are other similar materials. It can be shown that the bridge output signal in the system of FIGURE 4 is:

$$\Delta e_o = \frac{E_i Z_0 \Delta Z}{(Z_0 + Z_1)(Z_0 + Z_2)} \quad (1)$$

wherein $E_i$ is the voltage supply of the circuit, $Z_0$ is equal to the impedance of the indicated bridge arms, and $Z_1$ and $Z_2$ are the core impedances. It can also be shown that if the two cores are essentially at the same operating point and are made of identical materials then:

$$\Delta e_o = \frac{jL_0 \omega \frac{\partial \mu}{\partial H}(H)(dH_1 - dH_2)E_i Z_0}{(Z_0 + Z_1(H))(Z_0 + Z_2(H))} \quad (2)$$

In this expression $$\frac{\partial \mu}{\partial H}(H)$$

is the variable "gain" or sensitivity of the cores, $L_0$ is the inductance of each core in the absence of ferromagnetic material, $(dH_1 - dH_2)$ is the vector difference between the two effective fields within the core, $E_i$ is the voltage supply of the circuit, $Z_0$ the bridge arm impedances, $Z_1(H)$ and $Z_2(H)$ the instantaneous values of core impedances as scanned by the rotating bias field. The output voltage $\Delta e_o$ will in fact be significant only when $Z_1(H)$ and $Z_2(H)$ are in the vicinity of resonance, i.e., $Z_0$.

While the specific dimensions and configurations of the system of the present invention can be varied from the specific details disclosed herein of a preferred embodiment, it should be mentioned that in the system of FIGURE 1 the overall length of the apparatus is twenty feet while the diameter of the casing is approximately fifteen inches. It will be seen that relatively easily fabricated components are utilized and that elaborate balancing and stabilizing mechanisms are not required in order to achieve excellent results. Due to the symmetrical arrangement of the parts physically and the manner of electrical excitation and sensing the apparatus is insensitive to moderate changes in attitude and direction and yet measures any change in magnitude or in direction of the field gradient.

There has thus been disclosed an improved differential magnetometer. While the invention has been disclosed by reference to a specific preferred embodiment, it is of course to be understood that the same is done for purpose of illustration only and that those modifications and changes which become obvious to a person skilled in the art as a result of the teachings hereof are to be encompassed by the following claims.

What is claimed is:

1. A differential magnetometer system comprising in combination: support means defining an axis; magnetic field generating means including first and second core members secured to said support means and including means providing first and second magnetic fields in said cores radially directed from said axis and rotating in first and second separated parallel planes perpendicular to said axis; and signal detection means including first and second sensing circuits respectively coupled with said core members and respectively providing first and second output signals controlled by the associated core member, and means responsive to difference between said first and second signals.

2. A magnetometer system as defined in claim 1 wherein said magnetic field means includes: said first and second core members respectively disposed in said first and second planes and each having a plurality of rod members extending from the core in a direciton perpendicular to said axis, each said rod member of said first plurality being aligned with a corresponding rod member of said second plurality, excitation coil means associated with each of said rod members, and polyphase signal means coupled with said excitation coil means and providing a rotating excitation pattern to each of said pluralities of core members.

3. A system as defined in claim 2 wherein said core members are of material having nonlinear induction versus magnetic excitation characteristics.

4. A system as defined in claim 2 wherein said signal detection means includes a signal generator and magnetic field responsive sensing means including said sensing circuits coupled with each of said core members, said generator applying signals to each of said sensing circuits.

5. A system as defined in claim 2 wherein said detection means includes an impedance measuring system having a signal generator coupled with said cores and operating at a frequency which is substantially higher than the frequency of said polyphase signal means.

6. A system as defined in claim 4 wherein said sensing means includes first and second pluralities of signal windings each respectively associated with one of said core members, circuit means connecting said signal generator to each of said signal windings with the windings in one plurality being in parallel circuit arrangement with the windings in the other plurality, and signal output means conncted to each of the signal windings associated with said first core and the signal windings associated with the second core and providing signals which are proportional to the difference between the magnetic polariations of said first and second cores.

7. A system as defined in claim 6 wherein the frequency of output signals from said signal generator is higher than the frequency of the output signals from said polyphase signal means.

8. A differential magnetometer comprising in combination: a first plurality of elongated magnetic rods; a first central core member having said rods extending radially outward therefrom in coplanar relationship; a first plurality of excitation windings each disposed about one of said rods; a second plurality of elongated magnetic rods; a second central core member having said second plurality of rods extending radially outward therefrom in coplanar relationship; a second plurality of excitation windings each disposed about one of said second plurality of rods; support means holding said first and second pluralities of rods in parallel planes separated by a distance greater than the length of said rods and with each rod in said first plurality held in parallel alignment with a rod in said second plurality; signal generating means coupled with each of said windings and causing sequential energization thereof in a manner to provide in-phase rotating radial magnetic fields in the planes of said rods; and reluctance sensing means coupled with each of said core members and providing an output signal proportional to the difference in reluctance of said core members.

9. A magnetometer as defined in claim 8 wherein said sensing means includes: a first pickup frame having a plurality of arms connected to said first core member between adjacent rods extending therefrom, a first plurality of sensing windings each disposed about one of said arms, a second pickup frame having a plurality of arms connected to said second core member between adjacent rods etxending therefrom; a second plurality of sensing windings each disposed about one of the arms of said second frame, a second signal generating means connected to each of said sensing windings, and differential signal detecting means connected between said first and second pluralities of sensing windings.

10. A magnetometer as defined in claim 9 wherein said first signal generating means includes a polyphase signal source and said second signal generating means includes an oscillator operating at a frequency substantially higher than the frequency of said polyphase signal source.

References Cited

UNITED STATES PATENTS

| | | | |
|---|---|---|---|
| 2,047,609 | 7/1936 | Antranikian | 324—43 |
| 2,360,851 | 10/1944 | Curry | 324—43 |
| 2,373,096 | 4/1945 | Bonell | 340—197 |
| 2,749,506 | 5/1956 | Emerson | 340—197 |
| 2,897,438 | 7/1959 | Fearon | 324—47 |
| 3,050,679 | 8/1962 | Schonstedt | 324—43 |

FOREIGN PATENTS 579,439  8/1946  Great Britain.

RUDOLPH V. ROLINEC, Primary Examiner

R. J. CORCORAN, Assistant Examiner

U.S. Cl. X.R.

102—18, 19.2